US012687874B1

(12) United States Patent
Liu

(10) Patent No.: US 12,687,874 B1
(45) Date of Patent: Jul. 21, 2026

(54) POWER SUPPLY CONTROL DEVICE

(71) Applicant: SUPER POWER TOOLS CO., LTD., Taichung City (TW)

(72) Inventor: Yu-Chun Liu, Taichung City (TW)

( * ) Notice: Subject to any disclaimer, the term of this patent is extended or adjusted under 35 U.S.C. 154(b) by 0 days.

(21) Appl. No.: 19/186,853

(22) Filed: Apr. 23, 2025

(51) Int. Cl.
*G05F 1/625* (2006.01)

(52) U.S. Cl.
CPC .................................... *G05F 1/625* (2013.01)

(58) Field of Classification Search
CPC ............. G05F 1/00; G05F 1/625; H02J 13/00
See application file for complete search history.

(56) References Cited

U.S. PATENT DOCUMENTS

2013/0015706 A1* 1/2013 Chien ..................... G06F 1/266
307/38

* cited by examiner

*Primary Examiner* — Carlos Amaya
(74) *Attorney, Agent, or Firm* — EGBERT, MCDANIEL & SWARTZ, PLLC

(57) ABSTRACT

A power supply control device is disclosed. The device includes a power input port configured to be connected to a power source, a first output port configured to transmit power to a first electrical device, a second output port configured to transmit power to a second electrical device, and a third output port configured to transmit power to a third electrical device. A microprocessor, operating in response to a user-selected mode, compares a current value corresponding to power transmitted through the first output port to the first electrical device, and controls power transmission to the third electrical device via at least a third relay based on the comparison. The device enables automatic coordination of power transmission among multiple electrical devices, thereby eliminating the need for manual activation and deactivation and enhancing user convenience.

3 Claims, 5 Drawing Sheets

POWER SUPPLY CONTROL DEVICE

CROSS-REFERENCE TO RELATED APPLICATIONS

Not applicable.

FIELD OF THE INVENTION

The present invention relates to a control device configured to manage the power supply to a plurality of electrical devices. More particularly, the present invention relates to a power supply control device capable of coordinating the power activation and deactivation of multiple devices based on predetermined conditions.

BACKGROUND OF THE INVENTION

In woodworking applications, a vacuum cleaner is often used in conjunction with two woodworking machines to collect dust and wood chips generated during operation. When either of the woodworking machines is activated, the vacuum cleaner must also be activated. Conversely, the vacuum cleaner should only be deactivated when both of the woodworking machines have stopped operating.

In another common scenario, two electrical devices, such as an amplifier and an audio-video player, are used in conjunction with a television. To watch a movie or other video content, the user must manually power on the television, the amplifier, and the audio-video player. Similarly, when ceasing viewing, the user must manually power off each device.

In both scenarios described above, manual operation is required to activate or deactivate multiple electrical devices. Such manual control not only introduces inconvenience but may also result in user oversight, such as neglecting to turn off one or more devices, leading to unnecessary power consumption.

SUMMARY OF THE INVENTION

The primary objective of the present invention is to provide a power supply control device. To achieve this objective, the present invention employs the following technical solution A power supply control device includes a power input port configured to be connected to a power source. A first output port is configured to be electrically connected to a first electrical device, wherein the first output port is electrically connected to the power input port to supply power to the first electrical device, and a current value of the power supplied to the first electrical device is defined as a first output current. A second output port is configured to be electrically connected to a second electrical device, wherein a second relay is disposed in series between the power input port and the second output port to control power transmission to the second electrical device, and a current value of the power supplied to the second electrical device is defined as a second output current. A third output port is configured to be electrically connected to a third electrical device, wherein a third relay is disposed in series between the power input port and the third output port to control power transmission to the third electrical device. A microprocessor is electrically connected to a first sensor, a second sensor, the second relay, and the third relay, wherein the first sensor is electrically connected to the first output port and is configured to detect and transmit the first output current to the microprocessor, and wherein the second sensor is electrically connected to the second output port and is configured to detect and transmit the second output current to the microprocessor. A mode switch is electrically connected to the microprocessor and operable by a user to send control signals to the microprocessor, wherein the microprocessor is configured to execute an application to select between Mode 1 and Mode 2 to control the power supply to the second electrical device and the third electrical device.

In Mode 1, the microprocessor coordinates power transmission from the second output port and the third output port based on the power status of the first output port. In Mode 2, the microprocessor coordinates power transmission from the third output port based on the power statuses of both the first output port and the second output port.

The present invention is applied to control the power supply to multiple electrical devices, thereby eliminating the need for users to manually activate or deactivate each device. This significantly enhances user convenience and prevents unnecessary power consumption that may result from failing to turn off the power switch of a particular electrical device . . .

DETAILED DESCRIPTION OF THE INVENTION

A power supply control device according to a preferred embodiment of the present invention is configured to electrically connect a first electrical device, a second electrical device, and a third electrical device. The power supply control device enables selective and automated control of power supplied to these devices without requiring modifications to existing power line configurations.

Figure 1:
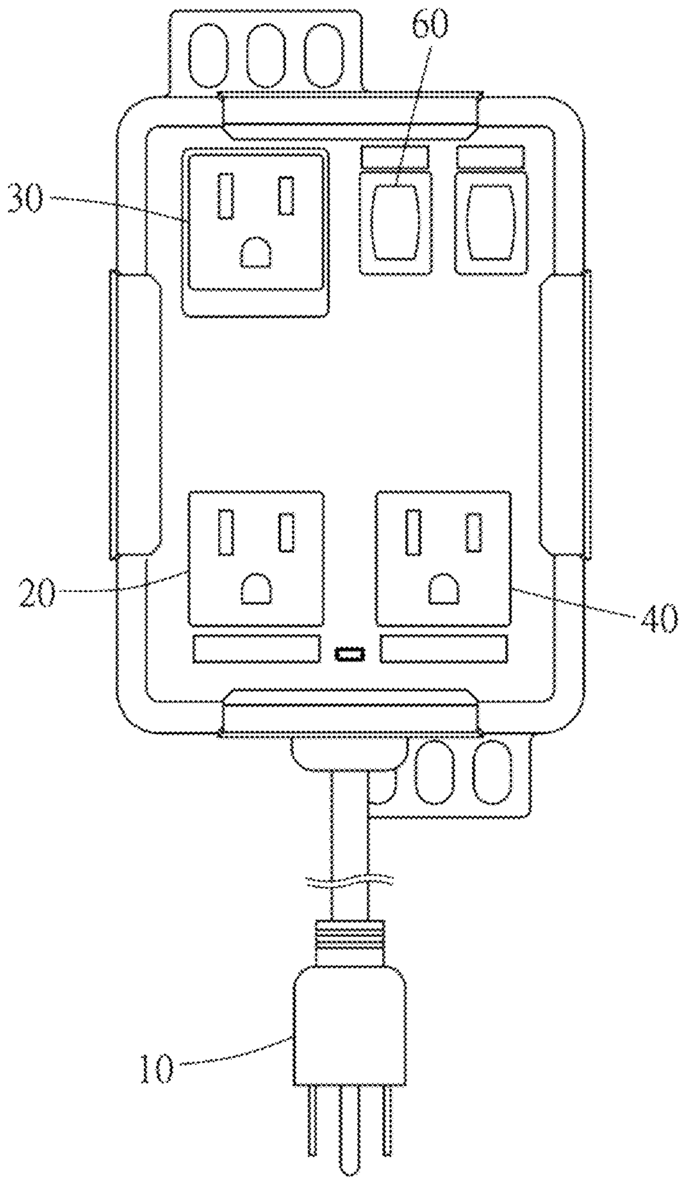
FIG. 1 is a front view of a preferred embodiment of the present invention.
Figure 2:
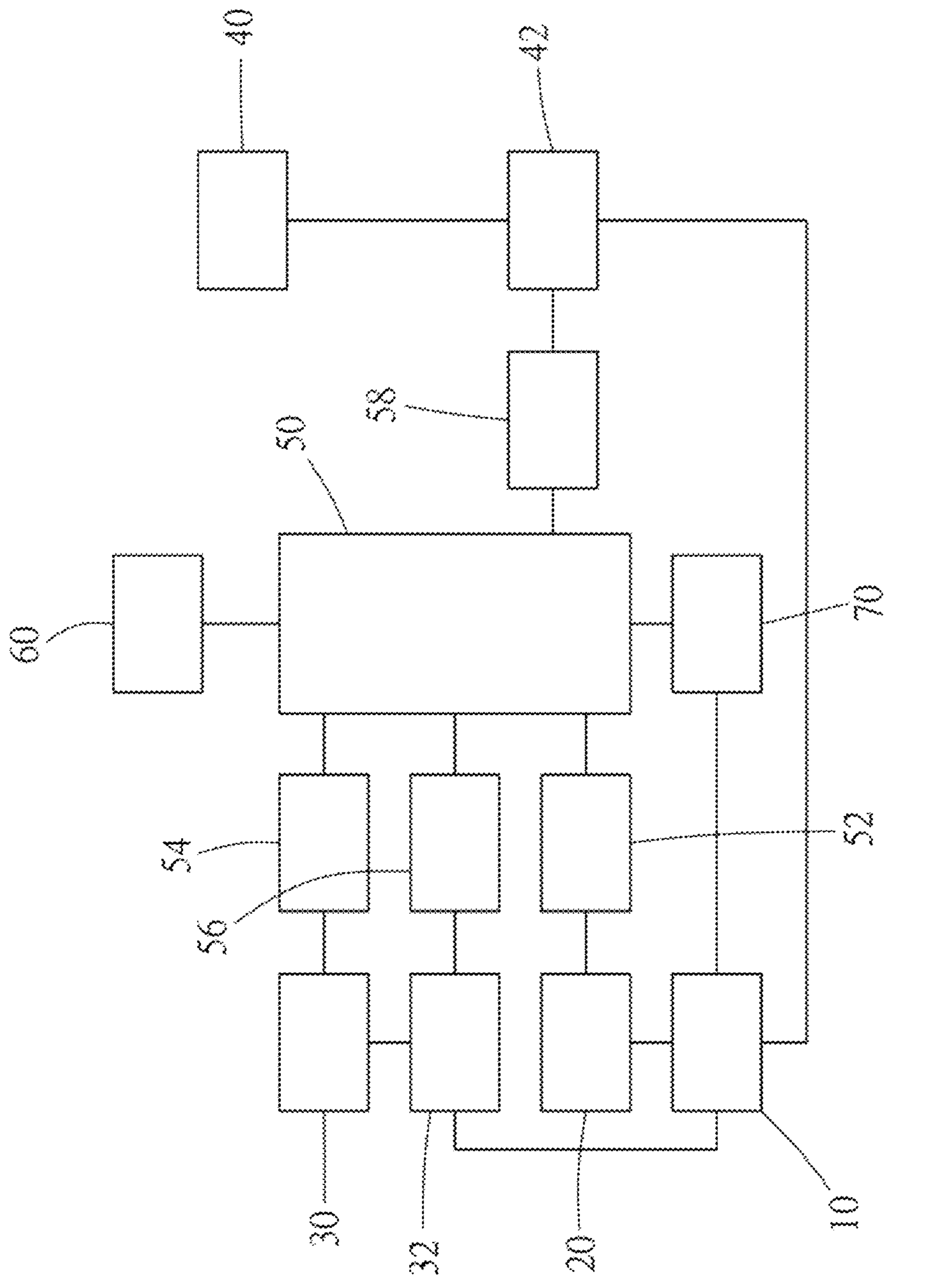
FIG. 2 is a circuit block diagram of the preferred embodiment.

As shown in FIGS. 1 and 2, the power supply control device comprises a power input port 10, a first output port 20, a second output port 30, a third output port 40, a microprocessor 50, and a mode switch 60. The power input port 10 is configured to connect to a power source (not shown) to receive electrical power and supply power to the devices. The first output port 20 is configured to be electrically connected to the first electrical device (not shown) and is directly coupled to the power input port 10 to supply power thereto. The current value of the power supplied to the first electrical device is defined as a first output current. The second output port 30 is configured to connect to the second electrical device (not shown), and a second relay 32 is disposed in series between the power input port 10 and the second output port 30 to control power transmission to the second electrical device. The current value of the power supplied to the second electrical device is defined as a second output current. Similarly, the third output port 40 is configured to connect to the third electrical device (not shown), and a third relay 42 is disposed in series between the power input port 10 and the third output port 40 to control power transmission to the third electrical device.

The microprocessor 50 is electrically connected to a first sensor 52, a second sensor 54, the second relay 32, and the third relay 42. The first sensor 52 is electrically connected to the first output port 20 and is configured to detect and transmit the first output current to the microprocessor 50. The second sensor 54 is electrically connected to the second output port 30 and is configured to detect and likewise transmit the second output current to the microprocessor 50.

The mode switch 60 is electrically connected to the microprocessor 50 and is operable by a user to send control signals to the microprocessor 50. In response, the microprocessor 50 executes a corresponding application to operate in one of two modes: Mode 1 or Mode 2. These modes determine how power is supplied to the second and third electrical devices.

In Mode 1, the microprocessor 50 coordinates power transmission from the second output port 30 and the third output port 40 based on the power status of the first output port 20. In Mode 2, the microprocessor 50 coordinates power transmission from the third output port 40 based on the power statuses of both the first output port 20 and the second output port 30. Through these two selectable modes, the microprocessor 50 enables automated control of power transmission to the first electrical device, the second electrical device, and the third electrical device.

In an initial state, both the second relay 32 and the third relay 42 are open. The user selects Mode 1 by operating the mode switch 60.

Figure 3:
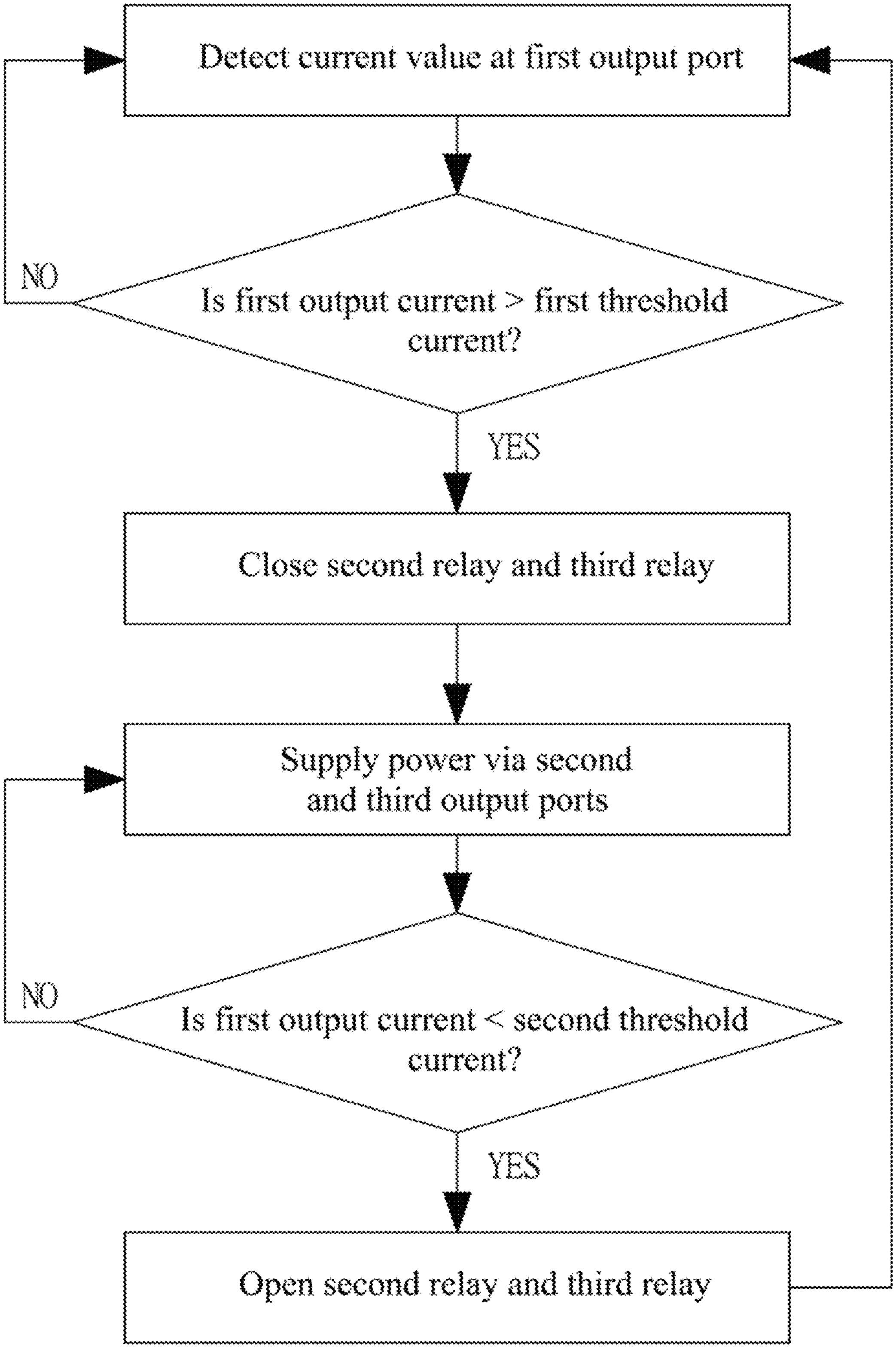
FIG. 3 is a partial flowchart of the preferred embodiment executing Mode 1.

As shown in FIG. 3, in Mode 1, the microprocessor 50 compares the first output current with a preset first threshold current.

The first threshold current is a reference current determined based on the current delivered through the first output port 20 to the first electrical device when the first electrical device is in an operational state. The first threshold current does not correspond to the actual current demand of the first electrical device during operation but rather serves as a threshold for detecting the device's operational status. When the first output current exceeds the first threshold current, it is interpreted that the first electrical device is in operation. In the present embodiment, the first threshold current is set to 5 amperes.

If the first output current exceeds the first threshold current, the microprocessor 50 transmits control signals to close the second relay 32 and the third relay 42, thereby enabling the transmission of power to the second and third electrical devices through the second output port 30 and the third output port 40.

If the first output current does not exceed the first threshold current, both the second relay 32 and the third relay 42 remain open state, and no power is supplied to the second and third electrical devices.

When the second relay 32 and the third relay 42 are close, the microprocessor 50 compares the first output current with a preset second threshold current.

The second threshold current is also a reference current determined based on the current delivered through the first output port 20 to the first electrical device when the first electrical device is in a non-operational state, and the second threshold current is lower than the first threshold current. When the first output current does not exceed the second threshold current, it is interpreted that the first electrical device is not in operation. In the present embodiment, the second threshold current is set within a range of 0.2 to 0.4 amperes.

If the first output current does not exceed the second threshold current, the microprocessor 50 transmits control signals to the second relay 32 and the third relay 42 to open their respective circuits and interrupt current flow. As a result, power is no longer supplied through the second output port 30 and the third output port 40, and the second electrical device and the third electrical device are deactivated due to power cutoff.

Mode 1 is applicable in scenarios where the second electrical device and the third electrical device are intended to operate in conjunction with the first electrical device. For instance, as mentioned in the prior art, an amplifier and an audio-video player may be used in conjunction with a television. When the user activates the first electrical device (e.g., the television), the second and third electrical devices automatically receive power and begin operation. Conversely, when the user deactivates the first electrical device, the second and third electrical devices are automatically powered off. This arrangement eliminates the need for the user to manually operate each device individually, thereby enhancing operational convenience and preventing unintended power consumption caused by oversight, such as failing to turn off the amplifier or audio-video player.

In Mode 2, the second relay 32 and the third relay 42 are initially in an open state. The user operates the mode switch 60 to select Mode 2, prompting the microprocessor 50 to execute the corresponding control logic.

Figure 4:
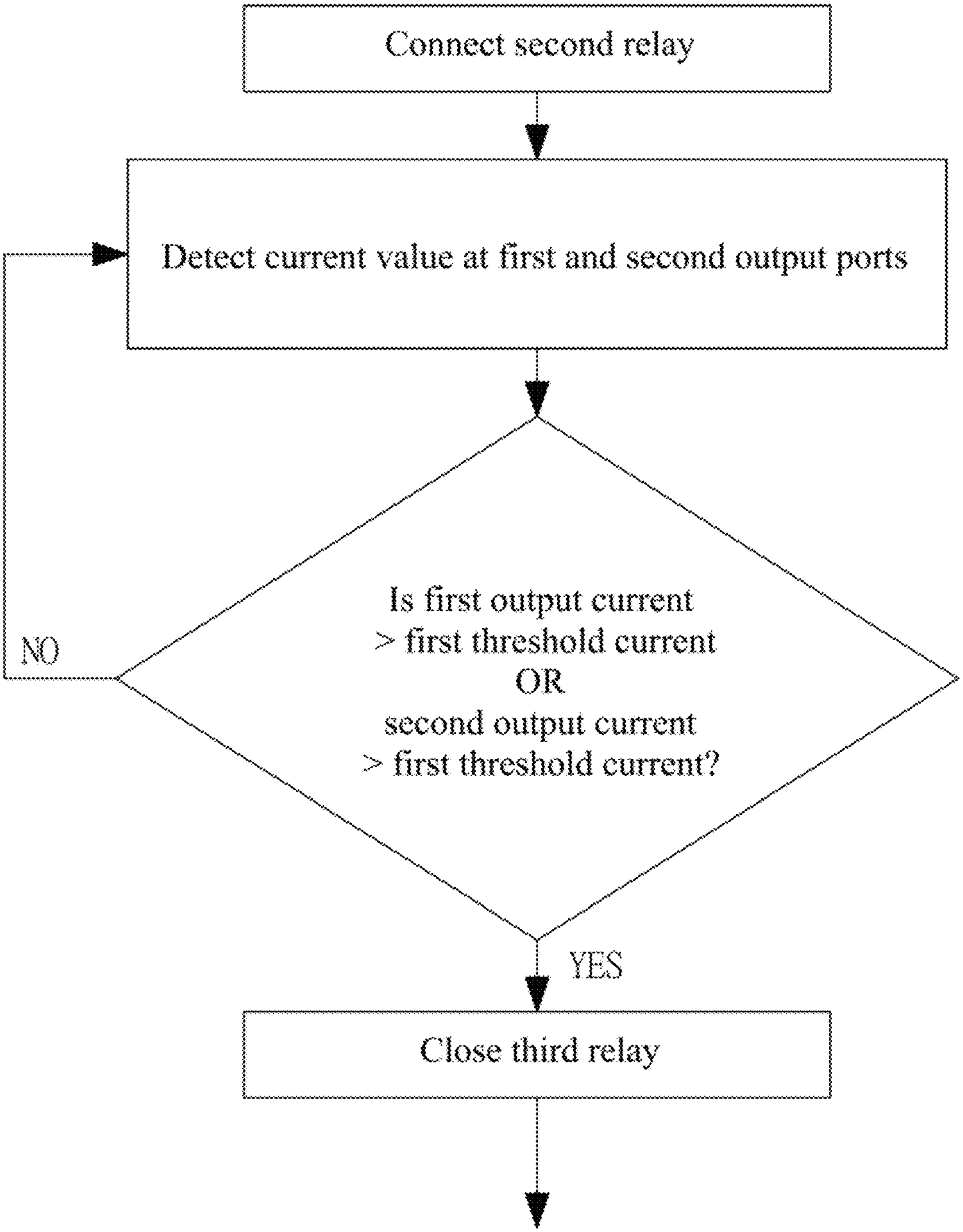
FIG. 4 is a partial flowchart of the preferred embodiment executing Mode 2.
Figure 5:
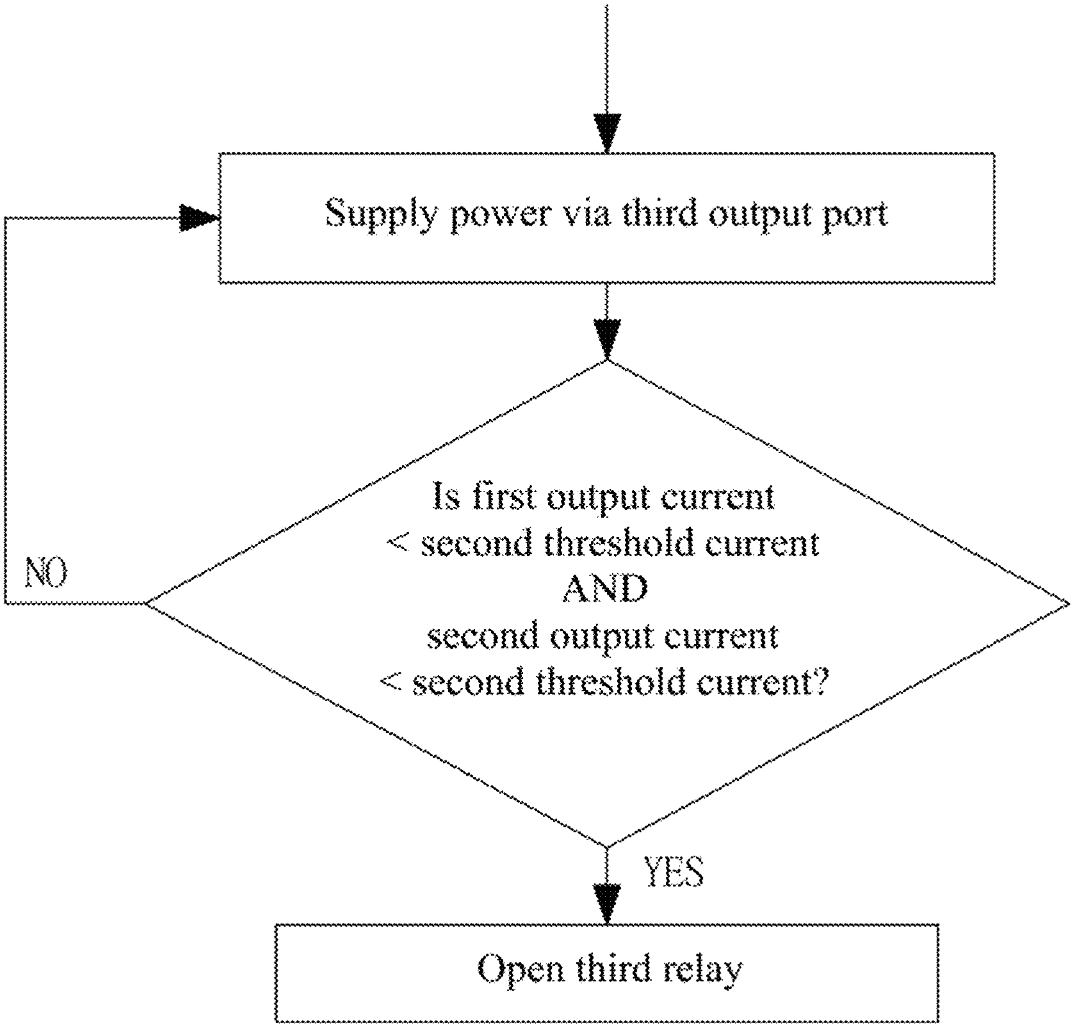
FIG. 5 is a continuation of FIG. 4, showing another part of the flowchart for executing Mode 2.

As illustrated in FIGS. 4 and 5, the microprocessor 50 transmits control signals to close the second relay 32, thereby enabling power supply to the second electrical device.

The microprocessor 50 then compares the first output current and the second output current with the first threshold current.

If either the first output current or the second output current exceeds the first threshold current, the microprocessor 50 transmits a control signal to close the third relay 42, thereby enabling the transmission of power to the third electrical device through the third output port 40.

If both currents do not exceed the first threshold current, the third relay 42 remains open state, and no power is supplied to the third electrical device.

When the third relay 42 is in a close state, the microprocessor 50 compares the first output current and the second output current with the preset second threshold current.

If both the first output current and the second output current do not exceed the second threshold current, the microprocessor 50 transmits a control signal to the third relay 42 to open the circuit and interrupt current flow. As a result, power is no longer supplied through the third output port 40, and the third electrical device is deactivated due to the loss of power.

Mode 2 is applicable in scenarios where the third electrical device is intended to operate in conjunction with both the first electrical device and the second electrical device. For instance, as mentioned in the prior art, a vacuum cleaner may be used in combination with two woodworking machines. When the user activates either the first electrical device or the second electrical device (i.e., either woodworking machine), the third electrical device (i.e., the vacuum cleaner) automatically receives power and begins operation. Conversely, when both the first electrical device and the second electrical device are deactivated, the third electrical device automatically shuts down due to power interruption. This arrangement eliminates the need for the user to manually control the third electrical device, thereby enhancing operational convenience and preventing unintended operation, such as failing to activate or deactivate the vacuum cleaner's power switch in a timely manner.

The power supply control device of the present invention is particularly suitable for controlling the power supply to multiple machining tools in industrial settings. Given the inherent risks associated with the operation of such machinery, the integrated power control system eliminates the need for users to manually toggle power switches for multiple devices. This significantly reduces potential hazards arising from repeated movement, switching, or plugging and unplugging of power cords, thereby enhancing operational safety.

A voltage rectification module 70 is electrically connected between the power input port 10 and the microprocessor 50. When the power input port 10 is connected to an alternating current (AC) power source, the voltage rectification module 70 converts the AC power to direct current (DC) and supplies the rectified DC power to the microprocessor 50.

A second driver circuit 56 is electrically connected between the second relay 32 and the microprocessor 50 and is configured to amplify control signals transmitted from the microprocessor 50 to the second relay 32. Similarly, a third driver circuit 58 is electrically connected between the third relay 42 and the microprocessor 50 and is configured to amplify control signals transmitted from the microprocessor 50 to the third relay 42.

The invention claimed is:

1. A power supply control device, comprising:

a power input port configured to be connected to a power source;

a first output port configured to be electrically connected to a first electrical device, wherein the first output port is electrically connected to the power input port to supply power to the first electrical device, and a current value of the power supplied to the first electrical device is defined as a first output current;

a second output port configured to be electrically connected to a second electrical device, wherein a second relay is disposed in series between the power input port and the second output port to control power transmission to the second electrical device, and a current value of the power supplied to the second electrical device is defined as a second output current;

a third output port configured to be electrically connected to a third electrical device, wherein a third relay is disposed in series between the power input port and the third output port to control power transmission to the third electrical device;

a microprocessor electrically connected to a first sensor, a second sensor, the second relay, and the third relay, wherein the first sensor is electrically connected to the first output port and is configured to detect and transmit the first output current to the microprocessor, and wherein the second sensor is electrically connected to the second output port and is configured to detect and transmit the second output current to the microprocessor; and a mode switch electrically connected to the microprocessor and operable by a user to send control signals to the microprocessor, wherein the microprocessor is configured to execute an application to select between Mode 1 and Mode 2 to control the power supply to the second electrical device and the third electrical device;

wherein, in Mode 1, the microprocessor coordinates power transmission from the second output port and the third output port based on the power status of the first output port; and wherein, in Mode 2, the microprocessor coordinates power transmission from the third output port based on the power statuses of both the first output port and the second output port.

2. The power supply control device according to claim 1, further comprising a voltage rectification module electrically connected between the power input port and the microprocessor, the voltage rectification module being configured to supply rectified DC power to the microprocessor when the power input port is connected to an AC power source.

3. The power supply control device according to claim 1, further comprising a second driver circuit electrically connected between the second relay and the microprocessor and configured to amplify a control signal transmitted from the microprocessor to the second relay; and a third driver circuit electrically connected between the third relay and the microprocessor and configured to amplify a control signal transmitted from the microprocessor to the third relay.

* * * * *